Patented Feb. 27, 1934

1,948,926

UNITED STATES PATENT OFFICE 1,948,926

CONDENSATION PRODUCT OF THE PYRENQUINONE SERIES AND PROCESS OF PREPARING IT

Georg Kränzlein and Heinrich Vollmann, Hochst-on-the-Main, Germany, assignors to General Aniline Works, Inc., New York, N. Y., a corporation of Delaware No Drawing. Application March 6, 1928, Serial No. 259,598. In Germany March 12, 1927

12 Claims. (Cl. 260—61)

Our present invention relates to condensation products of the pyrenquinone series and process of preparing them, more particularly to dyestuffs of the following constitution:

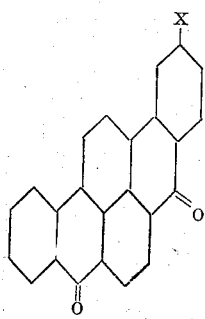

wherein X stands for halogen or alkyl.

In U. S. patent specifications Nos. 1,564,584 and 1,582,475 there has been described the preparation of the 3.4.8.9-dibenzpyrenquinone-5.10 which is formed by the action of benzoyl chloride upon benzanthrone in the presence of aluminium chloride and advantageously while using oxygen. In the course of this process the Bz-1-benzoyl-benzanthrone is intermediately obtained.

This invention is based on the discovery that a 4.5.8.9-dibenzpyrenquinone-3.10 is obtained by condensing a 2-aroylbenzanthrone with aluminium chloride or sodium-aluminium chloride, advantageously likewise with introduction of oxygen or air. The reaction may be illustrated by the following:

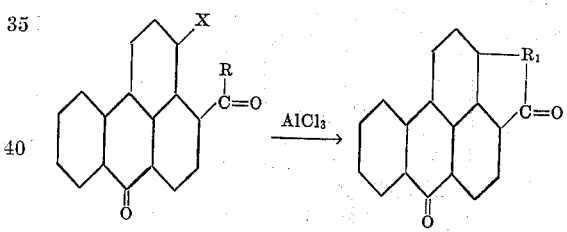

The products which are thus obtained in an excellent yield and purity dye cotton from an orange-yellow vat intense yellowish-red tints. This is a surprising observation since 4.5.8.9.-dibenzpyrenquinone-3.10 has presumably been prepared already by R. Scholl (cf. "Berichte der Deutschen Chemischen Gesellschaft" volume 55, page 122/123) from 1.4-dibenzoylnaphthalene with a yield, however, of only about 5 per cent and is stated by this author to show no affinity to the vegetable fiber.

The 2-aroylbenzanthrones used as starting materials in the process of our present invention have hitherto not been known. They can be prepared from the 2-benzanthronecarboxylic acid of the melting point 307° C. (obtainable according to Example 2 of our co-pending U. S. patent application Ser. No. 218,573 filed September 9, 1927) by transforming it into its chloride and condensing the latter with a hydrocarbon or the like according to Friedel Craft's method.

We have furthermore found that by treating the said pyrenquinone derivatives with a halogen or a halogenating agent new dyestuffs are obtained which in part considerably differ from the non-halogenated products as regards the tints they yield. On the introduction of chlorine brighter tints, on brominating darker tints are obtained.

The following examples illustrate our invention, the parts being by weight:

(1) 10 parts of 2-benzoylbenzanthrone, which melts at 176° C. and forms when recrystallized from xylene yellow needles, are mixed, while stirring, with 150 parts of sodium-aluminium chloride for about 15 hours at 110° C. to 125° C. while introducing oxygen into the molten mass. The melt which has at first a red appearance has then assumed an olive-green coloration. On pouring it into water, the dibenzpyrenquinone which has been formed is separated as red flakes which are filtered by suction and dried. The product which is obtained in an excellent yield and in a comparatively pure state crystallizes from nitrobenzene in the form of flat red needles. It has the formula:

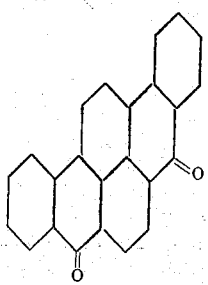

(2) 100 parts of para-bromobenzoyl-2-benzanthrone, which when recrystallized from xylene forms yellow felted needles melting at 245° C., are treated with 1200 parts of sodium-aluminium chloride while introducing oxygen as indicated in the preceding example. On working up the melt a light red crude product is obtained with a nearly quantitative yield. The monobromo-4.5.8.9-dibenzpyrenquinone-3.10 thus obtained crystallizes from nitrobenzene in the form of flat red needles. It is soluble in concentrated sulfuric acid to a solution which is in a thick layer reddish-brown, in a thin layer pink; on gradually diluting this solution with water its color changes first to olive-green and finally the dyestuff is precipitated in the form of yellowish-red flakes. The vat of the dyestuff is reddish-orange, cotton is dyed in it a reddish-orange tint. When exposed to the air the color of the dyeing changes by oxidation first to violet and then to red. The dyestuff has the following formula:

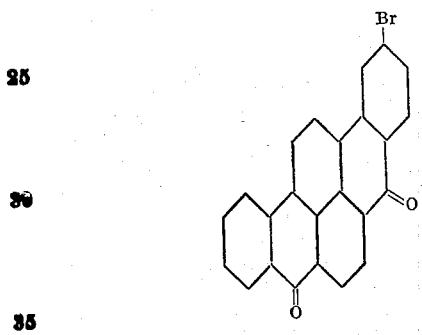

(3) 20 parts of 2-para-toluylbenzanthrone forming when recrystallized from benzene or glacial acetic acid yellow needles and melting at 173° C. are stirred at 115° C. to 120° C. for 22 hours with 250 parts of sodium-aluminium chloride oxygen being introduced during this time. The melt yields after the decomposition with dilute hydrochloric acid red flakes. The methyldibenzpyrenquinone thus obtained crystallized from nitrobenzene in the form of flat red needles. The yield of the pure product amounts to about 90 per cent of the theory. The color of its solution in concentrated sulfuric acid is in a thick layer reddish-brown, in a thin layer pink. The vat is orange. The dyestuff dyes cotton bright red tints. It has the formula:

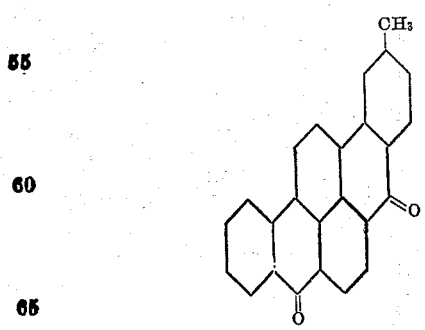

(4) By melting α-naphthoyl-2-benzanthrone (forming when recrystallized from glacial acetic acid yellow needles and melting at 222° C., soluble in concentrated sulfuric acid to a red solution) with sodium-aluminium chloride in the same manner as indicated in the preceding examples, the corresponding naphthobenz-pyrenquinone is obtained which dyes cotton in an orange vat colored red (claret) tints with a pronounced blue hue having very good fastness properties. The dyestuff has the following formula:

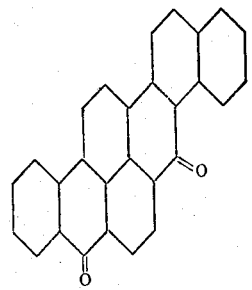

(5) 10 parts of 4.5.8.9-dibenzpyrenquinone-3.10 (prepared as indicated in Example 1) are dissolved in 180 parts of chlorosulfonic acid, to this solution is added a small quantity of iodine and chlorine is introduced therein, while cooling. The introduction of chlorine is stopped as soon as a test given into water yields reddish-orange flakes. The whole solution is then poured into water, while stirring, and the separated dyestuff is isolated by filtering with suction. The dyestuff thus chlorinated dyes cotton from a violet vat brilliant reddish-orange tints fast to chlorine and washing. It has the following formula:

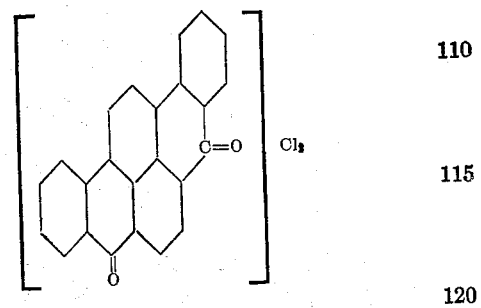

When continuing the introduction of chlorine for several hours, the dyestuff takes up more chlorine.

(6) 20 parts of bromine are added to a mixture prepared from 4.5.8.9-dibenzpyrenquinone in the manner indicated in the preceding example and the whole is stirred at 40° C. to 80° C. for 20 hours. The mass is then poured on water and the brominated dyestuff is isolated as usual in the form of bluish-red flakes. It dyes cotton from an orange vat vivid bluish-red tints fast to chlorine and washing. It has the following formula:

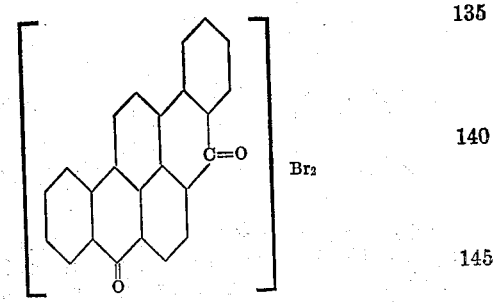

We claim:
1. The process which comprises treating with an acid condensing agent, while introducing oxygen, a compound of the following general structure:

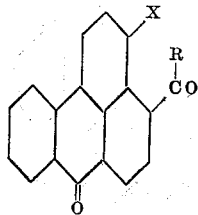

wherein R stands for an aromatic hydrocarbon radical of the benzene and naphthalene series containing at least one unsubstituted ortho-position to the CO-group, X stands for hydrogen.

2. The process which comprises treating with aluminium chloride in the presence of a fluxing material at about 90° C. to about 150° C., while introducing oxygen, a compound of the following general structure:

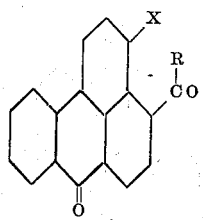

wherein R stands for an aromatic hydrocarbon radical of the benzene and naphthalene series containing at least one unsubstituted ortho-position to the CO-group, X stands for hydrogen.

3. The process which comprises treating with sodium aluminium-chloride at about 90° C. to about 150° C., while introducing oxygen, a compound of the following general structure:

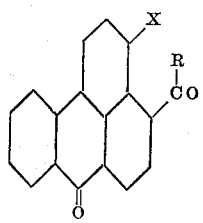

wherein R stands for an aromatic hydrocarbon radical of the benzene and naphthalene series containing at least one unsubstituted ortho-position to the CO-group, X stands for hydrogen.

4. The process which comprises treating with sodium-aluminium chloride at about 90° to 150° C., while introducing oxygen, a compound of the following formula:

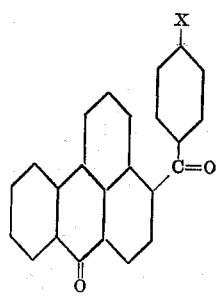

wherein X stands for hydrogen, halogen or methyl.

5. The process which comprises treating with sodium-aluminium chloride at about 110° to 125° C., while introducing oxygen, the compound of the following formula:

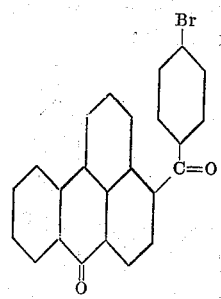

6. The process which comprises treating with aluminium chloride in the presence of a fluxing material at about 90° C. to about 150° C., while introducing oxygen, a compound of the following general structure:

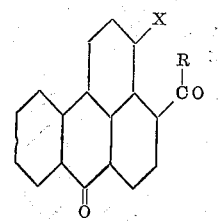

wherein R stands for an aromatic hydrocarbon radical of the benzene and naphthalene series containing at least one unsubstituted ortho-position to the CO-group, X stands for hydrogen, and subsequently treating the product thus obtained with a halogenating agent.

7. The process which comprises treating with sodium-aluminium chloride at about 90° C. to about 150° C., while introducing oxygen, a compound of the following general structure:

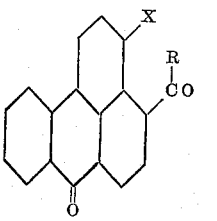

wherein R stands for an aromatic hydrocarbon radical of the benzene and naphthalene series containing at least one unsubstituted ortho-position to the CO-group, X stands for hydrogen, and subsequently treating the product thus obtained with a halogenating agent.

8. The process which comprises treating with sodium-aluminium chloride at about 90° to 150° C., while introducing oxygen, a compound of the following formula:

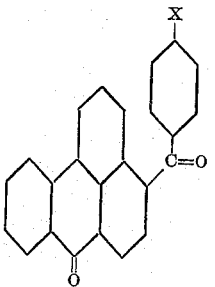

wherein X stands for hydrogen, halogen or methyl, and subsequently treating the product, thus obtained, with a halogenating agent and a catalyst while heating.

9. The process which comprises treating with sodium-aluminium chloride at about 110° to 125° C., while introducing oxygen, the compound of the following formula:

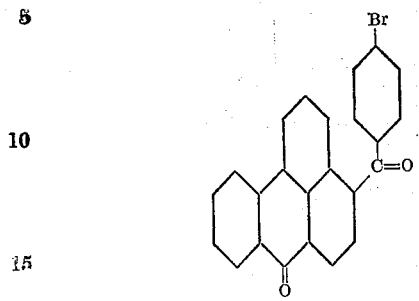

and subsequently treating the product, thus obtained, with bromine and a small quantity of iodine at about 40° to 80° C.

10. As new products, compounds of the following formula:

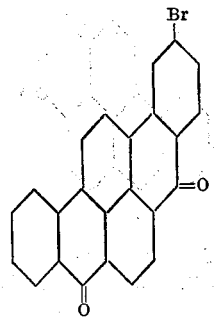

wherein X stands for halogen or alkyl.

11. As a new product, the compound of the following formula:

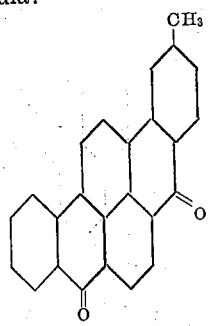

forming yellowish-red flakes and dying cotton from a reddish-orange vat red tints.

12. As a new product, the compound of the following formula:

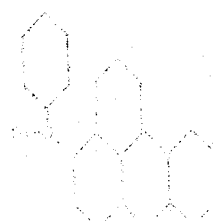

crystallizing from nitrobenzene in the form of a flat red needles and dyeing cotton from an orange vat bright red tints.

GEORG KRÄNZLEIN.
HEINRICH VOLLMANN.